(12) United States Patent
Lee et al.

(10) Patent No.: US 6,788,630 B1
(45) Date of Patent: *Sep. 7, 2004

(54) RECORDING MEDIUM FOR STORING LINKING TYPE INFORMATION, METHOD OF PROCESSING DEFECTIVE AREA USING THE SAME, AND RECORDING AND/OR REPRODUCING APPARATUS THEREFOR

(75) Inventors: Kyung-geun Lee, Seongnam (KR); Jung-wan Ko, Yongin (KR); Young-yoon Kim, Seoul (KR); In-sik Park, Suwon (KR); Yoon-ki Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 09/526,524

(22) Filed: Mar. 16, 2000

(51) Int. Cl.[7] .......................... G11B 5/09; G11B 15/52; G11B 19/02; G11B 20/10
(52) U.S. Cl. ............................... 369/47.14; 369/13.25; 369/53.15
(58) Field of Search ........................ 369/47.14, 53.15, 369/53.16, 53.17, 275.3, 74, 34, 13.25, 13.26; 714/6

(56) References Cited

U.S. PATENT DOCUMENTS 5,132,956 A * 7/1992 Ichikawa .................. 369/53.17

(List continued on next page.)

FOREIGN PATENT DOCUMENTS

EP 0 379 445 A2 7/1990

(List continued on next page.)

OTHER PUBLICATIONS

U.S. patent application Ser. No. 09/526,548, filed Mar. 16, 2000, Kyung–geun Lee et al.

(List continued on next page.)

Primary Examiner—David Hudspeth
Assistant Examiner—Jason Olson
(74) Attorney, Agent, or Firm—Staas & Halsey LLP

(57) ABSTRACT

A recording medium storing linking type information, a method of processing a defective area in the medium and recording and/or reproducing apparatus therefor. The recording medium stores information indicating that linking is applied immediately after the defective area, distinguishing a linking type which occurs in a general incremental recording mode from a linking type which occurs after the defective area. Defective areas are detected and registered in a predetermined area (recording management data (RMD) area) before user data is recorded or while user data is being recorded in the recording medium having a plurality of continuous basic recording units, such as a digital versatile disc-rewritable (DVD-RW) in which recording and reproducing can be done repeatedly. Linking is not only applied in an incremental recording mode or in a restricted overwrite recording mode, but linking is also applied to an area immediately after the defective area which is registered in the defect list, increasing reliability of the user data. In addition, a test signal such as data, a groove wobble pattern, or a recording mark which has a test pattern, which functions as linking data is recorded in advance in a block immediately after the defective area detected during certification. If the test signal is detected after the defective area, the new user data is recorded immediately after a predetermined number of error correction code (ECC) blocks following the defective area without using linking, reducing the time for recording linking data, which is advantageous to real-time recording. A recording/reproducing apparatus implements the recording medium and the process of processing defective areas on the recording medium.

7 Claims, 3 Drawing Sheets

| b31 | b24 b23 | | | | | | b0 |
|---|---|---|---|---|---|---|---|
| Sector information | Sector number | | | | | | |

| b31 | b30 | b29 | b28 | b27 b26 | b25 | b24 |
|---|---|---|---|---|---|---|
| Sector format type | Tracking method | Reflectivity | Linking type | Area type | Data type | Layer number |

U.S. PATENT DOCUMENTS

| | | | | |
|---|---|---|---|---|
| 5,956,309 | A | * 9/1999 | Yamamuro | 369/47.14 |
| 5,966,358 | A | * 10/1999 | Mine | 369/47.14 |
| 6,058,085 | A | * 5/2000 | Obata | 369/53.17 |
| 6,385,744 | B1 | * 5/2002 | Ando et al. | 714/54 |
| 6,477,127 | B1 | * 11/2002 | Osada et al. | 369/59.25 |
| 6,510,114 | B1 | * 1/2003 | Yeo et al. | 369/53.2 |

FOREIGN PATENT DOCUMENTS

| | | |
|---|---|---|
| EP | 0 800 172 A2 | 10/1997 |
| EP | 0 908 882 A2 | 4/1999 |
| EP | 0 908 882 A | 4/1999 |
| EP | 1 022 735 A1 | 7/2000 |
| EP | 1 022 735 A2 | 7/2000 |
| JP | 6-314174 | 11/1994 |
| JP | 8-273334 | 10/1996 |
| JP | 9-63203 | 3/1997 |
| JP | 9-265630 | 10/1997 |
| JP | 9-270171 | 10/1997 |
| JP | 10-269751 | 10/1998 |
| JP | 11-96602 | 4/1999 |
| JP | 2000-137948 | 5/2000 |
| JP | 2000-331436 | 11/2000 |

OTHER PUBLICATIONS

U.S. patent application Ser. No. 09/526,523, filed Mar. 16, 2000, Kyung–geun Lee et al.

"Standard ECMA–279: 80 mm and 120 mm DVD–Recordable Disk (DVD–R)"; XP–002168576, 16.1 Identification Data (ID), dated 00–12–1998.

"Standard ECMA–279: 80 mm and 120 mm DVD–Recordable Disk (DVD–R)", Dec. 1998, ECMA; Standarizing Information and Communication Systems XP002168576, pp. 26–27 and 33–34.

* cited by examiner

RECORDING MEDIUM FOR STORING LINKING TYPE INFORMATION, METHOD OF PROCESSING DEFECTIVE AREA USING THE SAME, AND RECORDING AND/OR REPRODUCING APPARATUS THEREFOR

CROSS-REFERENCE TO RELATED APPLICATIONS

This application claims the benefit of Korean Application Nos. 99-16462, filed May 8, 1999, 99-16973, filed May 12, 1999 and 99-23947, filed Jun. 24, 1999, in the Korean Patent Office, the disclosures of which are incorporated herein by reference.

BACKGROUND OF THE INVENTION

1. Field of the Invention

The present invention relates to the field of optical recording media having continuous basic recording units, and more particularly, to a recording medium for storing linking type information which indicates whether a linking scheme applies to an area immediately after a defective area and a method of processing a defective area using the same.

2. Description of the Related Art

Since basic recording units of a digital versatile disc-rewritable (DVD-RW) and a digital versatile-recordable (DVD-R) are positioned continuously, contrary to those of a DVD-Random Access Memory (DVD-RAM) which are divided by physical identifier (PID) areas or buffer fields (extra areas allocated to correspond to a requirement for controlling a spindle motor accurately), it is required that a recording-start point of each basic unit in a DVD-RW is precisely located. The basic recording unit of the DVD-RAM can be a sector and the basic recording unit of the DVD-RW can be an error correction code (ECC) block.

Since the basic recording units of the DVD-R and the DVD-RW, which have the same physical formats, are positioned continuously as described above, for an incremental recording mode, that is, the mode in which data transmission is momentarily discontinued or new data is recorded following the previous data, the DVD-R and the DVD-RW use a linking scheme in which a predetermined number of bytes (for example, 3 bytes) of a next recording-start point are allocated as a linking area. In addition, there are two linking area sizes which are applied in incremental recording; 2 kilobytes and 32 kilobytes.

FIG. 1 is a diagram illustrating the linking scheme which occurs in the general incremental recording mode, and shows old data 4, the 32-kilobyte linking area 2 and new data 7. Referring to FIG. 1, when recording of old data 4 is completed without filling up the basic recording unit (the ECC block unit in FIG. 1), padding data 5 is recorded from the remaining portion of the basic recording unit, where no data is recorded, to a first sector after a sync mark 1. Recording of the new user data 7 begins after recording linking data 6 in the 32-kilobyte linking area 2 for the incremental recording.

In the case of DVD-RW, when a defective area is registered in a defective area list which is registered in a recording management data (RMD) area, the DVD-RW uses a restricted overwrite recording mode along with the linking scheme similar to the incremental recording mode when recording actual user data after the registered defective area. Therefore, the current DVD-RW specification only applies a linking scheme for the incremental recording mode and the restricted overwrite recording mode. The DVD-RW specification does not define specific linking schemes for processing a defective area, such as defining a linking area after a defective area.

SUMMARY OF THE INVENTION

Therefore, it is an object of the present invention to provide a recording medium for storing linking type information which indicates whether linking occurs immediately after a defective area, in the recording medium in which basic recording units are positioned continuously.

It is another object to provide a recording medium in which a predetermined number of error correction code (ECC) blocks, which have the same effect as a linking area, are allocated immediately after a defective area, in the recording medium in which basic recording units are positioned continuously.

It is still another object to provide a method of processing a defective area in which user data is recorded after allocating a predetermined linking area immediately after a defective area according to linking type information which indicates whether linking occurs immediately after a defective area in recording.

It is yet still another object to provide a method of processing a defective area in which recording of a user data begins after a predetermined number of ECC blocks following a defective area.

Additional objects and advantages of the invention will be set forth in part in the description which follows and, in part, will be obvious from the description, or may be learned by practice of the invention.

To achieve the above objectives and other objectives of the present invention a recording and/or reproducing apparatus recording data on a recording medium having continuous basic recording units and reading the data from the recording medium and processing defective areas of the recording medium, comprises a pick-up device which records data on the recording medium and reproduces data from the recording medium and a processing unit which upon detecting one of the defective areas specifies a predetermined linking scheme in a linking area immediately after the one defective area during data recording by the pick-up device.

Further a recording and/or reproducing apparatus recording data on a recording medium having continuous basic recording units and reading the data from the recording medium and processing defective areas of the recording medium, comprises a pick-up device which records data on the recording medium and reproduces data from the recording medium; and a processing unit allocating a predetermined number of error correction code (ECC) blocks to an area immediately after one of the defective areas detected during certification and registering in a defective management area a list of the one defective area and information on the predetermined number of ECC blocks allocated immediately after the one defective area.

Further, a recording and/or reproducing apparatus recording data on a recording medium having continuous basic recording units and reading the data from the recording medium and processing defective areas of the recording medium, comprises a pick-up device which records the data on the recording medium and/or reproduces the data from the recording medium and a processing unit which detects the defective areas during certification before recording the data and while recording the data and registers a list of the defective areas in a defect management area of the recording medium and stores in a predetermined area of the recording medium additional information indicating whether a predetermined linking scheme is is applied to, specified in, or occurs in a linking area immediately after one of the defective areas.

Further, a recording and/or reproducing apparatus recording data on a recording medium having continuous basic recording units and reading the data from the recording medium and processing defective areas of the recording medium, comprising a processing unit which records that data after specifying a predetermined linking scheme in a linking area immediately after the one defective area upon detecting on of the defective areas during the data recording.

Further, a recording and/or reproducing apparatus recording data on a recording medium having continuous basic recording units and reading the data from the recording medium and processing defective areas of the recording medium, comprises a processing unit which detects defective areas in the recording medium that occur before recording the data and that occur while recording the data and registers a list of the defective areas in a defect management area in the recording medium, and stores in a predetermined area in the recording medium additional information indicating whether a predetermined linking scheme is applied to a linking area immediately after a defective area in the list of the defective areas.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
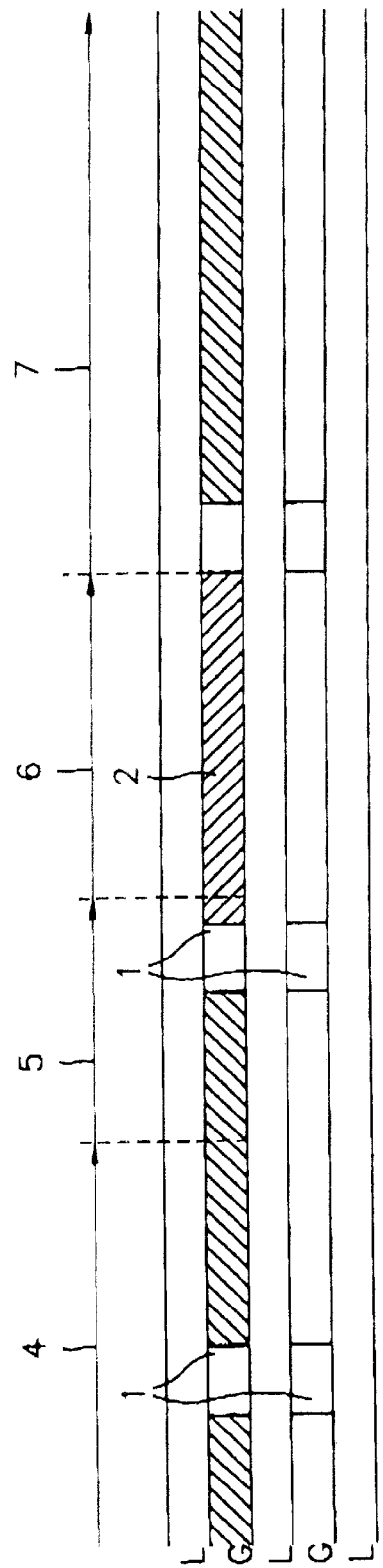
FIG. 1 illustrates a linking scheme occurring in a general incremental recording mode.

Reference will now made in detail to the present preferred embodiments of the present invention, examples of which are illustrated in the accompanying drawings, wherein like reference numerals refer to the like elements throughout. The embodiments are described below in order to explain the present invention by referring to the figures.

In a case where reference signals such as a wobble signal or a land pre-pit (LPP) signal are not generated as in the case of an uncorrectable error, that is, in a case where a large defect exists across a plurality of tracks, all signals (a wobble signal, an LPP signal, etc.) are not generated at all when a pick-up unit passes through the defective area. In this case, continuous recording becomes impossible, and, since data must be recorded after the defective area, the same mode as an incremental recording mode is applied.

In a DVD-RW, data is recorded in groove tracks, and information which indicates physical ECC block numbers is recorded in the form of pre-pits in land tracks and referred to as the LPP signal. In addition, groove tracks are wobbled with a predetermined frequency.

Therefore, it is necessary to define a new linking scheme, since as described above currently after the defective area a linking scheme occurs which is defined only for a general incremental recording mode or a restricted overwrite recording mode. Since the linking scheme defined by the DVD-RW specification applies to only an incremental recording mode and a restricted overwrite recording mode, the new linking scheme would apply to an area immediately after the defective area.

The type of linking immediately after the defective area needs to be distinguished from the type of linking used in the general incremental recording mode and the restricted overwrite recording mode. That is, the linking in the general incremental recording mode and the restricted overwrite recording mode occurs when new data is recorded after stopping the recording of as much data as can be recorded at a time. This linking is not defined in a write-at-once recording mode.

However, according to the present invention the linking occurs immediately after the defective area, and occurs in a situation in which recording data as much as can be recorded at a time is not completely performed.

Figure 2:
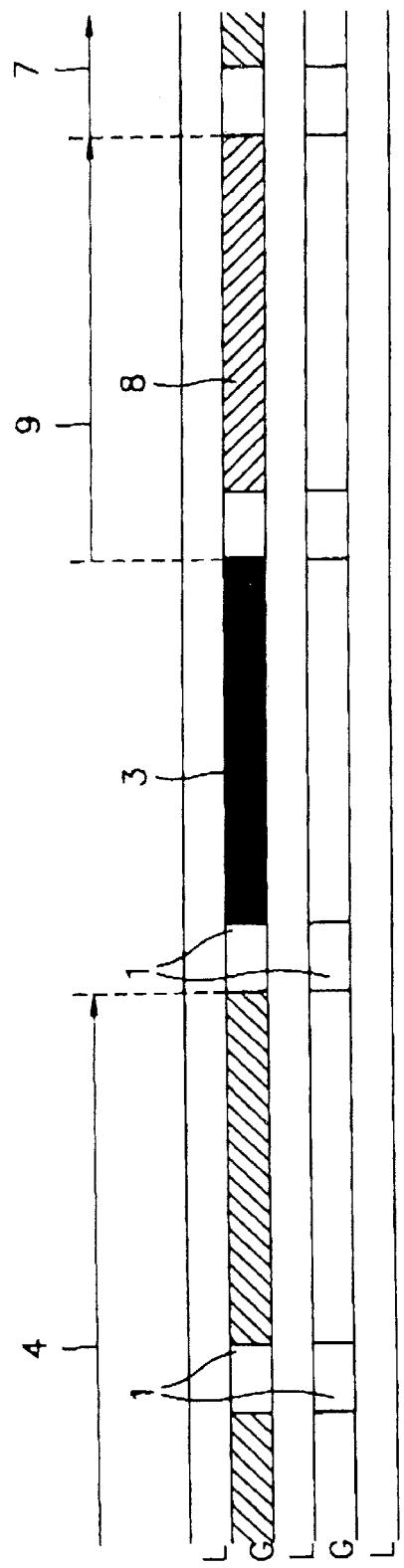
FIG. 2 illustrates an example of a method of processing defective area according to the present invention.

FIG. 2 illustrates an example of a method of processing the defective area according to the present invention. During certification, after registering a defect list in a recording management data (RMD) area, a linking area is allocated after the defective area, and the new user data is recorded after the linking area.

The RMD area stores the list of defective areas found while using the recording medium as well as the list of the defective areas found during certification. According to the present invention, the RMD area stores the list of the defective areas found before or during recording of the user data. At the same time, for example, a data identifier (DID) area at the beginning of a sector (which can be the ECC block or the sector) where the defective data is included or located stores linking type information which indicates whether or not linking is applied after the defective area when recording the user data. Then, the new user data is recorded after applying a linking scheme to the area immediately after the defective area. In another example, the basic recording unit stores the linking type information as additional information, which indicates whether linking is applied immediately after the defective area and the linking type information can be referenced or accessed. Using the linking type information, the recording medium can recognize the linking data, thereby differentiating between the linking data and the user data.

That is, when the defective area 3, which is registered in the list of defective areas in the RMD area, is found while recording the user data 4, the defective area 3 is skipped without recording the user data. At this time, for the defective area 3, optical power beam which is emitted from an optical power source such as a laser device is lowered down to a level that cannot affect recording, for example, under a read power beam. Therefore, an optical power source emitting a write power beam during recording the user data lowers the write power beam upon detecting the defective area 3 so that the lowered power beam does not affect recording. The linking area 8 immediately after the defective area 3 is filled with linking data 9, and the new data 7 begins to be recorded. The size of the linking area 8 occurring immediately after the defective area 3 may be either 2 KB or 32 KB, however, a size of 2 KB is advantageous in real time read/write (RTRW) operation.

In the meantime, since linking according to the present invention can be found through detection of the defective areas during certification, the linking data can be recorded in advance immediately after the detected defective area according to a predetermined linking scheme (2 KB or 32 KB). At this time, information is recorded in the data type information in the DID as shown in FIG. 3 indicating that the linking data is recorded, and the linking type information indicating that linking occurs immediately after the defective area is recorded in the linking type information in the DID as shown in FIG. 3.

Since padding data (for example, 00h) is recorded in the remaining portion of the basic recording unit, in a padding data area immediately before the defective area, when the basic recording unit is not filled up with the user data, the padding data can be recorded in advance in the basic recording unit immediately before the defective area. This padding data area can be overwritten when recording the actual user data.

When recording the user data after certification, the linking data is recorded in advance immediately after the defective area so that the user data can be recorded immediately after the linking area. Therefore, time for recording the linking data is shortened, and it is advantageous in real-time recording because the user data is recorded immediately after the defective area and the linking area.

Figure 3:
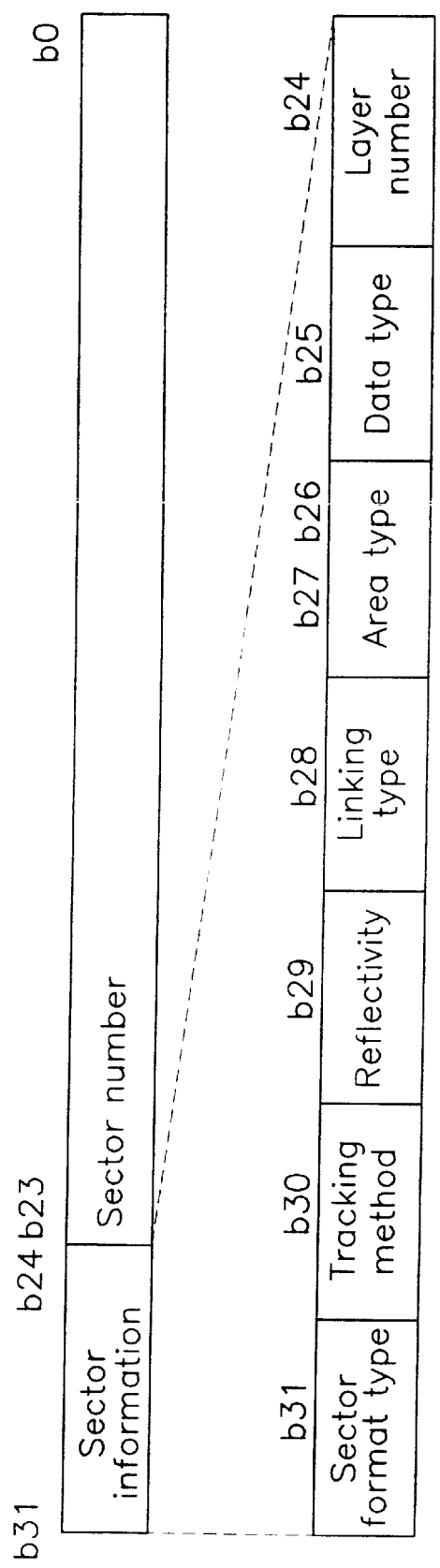
FIG. 3 illustrates the structure of a data identification (DID) area as an example of storing linking type information according to the present invention.

FIG. 3 illustrates an example of storing the linking type information according to the present invention in the DID area which is allocated for each sector and has 4 bytes. Data identification information includes sector information and a sector number, and sector information includes sector format type, tracking method, reflectivity, linking type, area type, data type, and layer number.

Sector format type information of bit position b31 represents constant linear velocity (CLV) or zone constant linear velocity (ZCLV) as follows.

0b: CLV format type

1b: Zoned format type, specified for Rewritable discs

Tracking method information of bit position b30 represents pit tracking or groove tracking as follows.

0b: Pit tracking

1b: Groove tracking, specified for Rewritable discs

Reflectivity information of bit position b29 represents whether reflectivity exceeds 40% or not as follows.

0b: If the reflectivity is greater than 40%

1b: If the reflectivity is less than or equal to 40%.

Area type information of bit position b27 and b26 represents a data area, a lead-in area, a lead-out area, or a middle area for a read-only disc as follows.

00b: In the data area

01b: In the Lead-in area

10b: In the Lead-out area

11b: In the middle area of read-only discs

Data type information of bit position b25 represents read-only data, or the linking data as follows.

0b: Read-only data

1b: Linking data

Layer number information of bit position b24 represents layer number in a single layer disc or a dual layer disc as follows.

0b: Layer 0 of dual layer discs or single layer discs

1b: Layer 1 of dual layer discs

According to the present invention, linking type information is defined as follows and recorded, by using b28 which is a reserved bit in the sector information area in conventional methods.

0b: Linking for incremental recording

1b: Linking after defective area

If the linking type information is binary number "0", it indicates linking for the incremental recording mode, and if it is binary number "1", it indicates linking immediately after the defective area. Here, the linking type which occurs in the incremental recording mode or the restricted overwrite recording mode can be referred to as linking type I, and the linking type which occurs immediately after the defective area can be referred to as linking type II.

Therefore, by indicating the linking type in the linking type information of the DID, the general linking type and the linking type according to the present invention can be distinguished. If information indicating linking immediately after the defective area is included in the DID of the sector in which linking occurs, when linking occurs in the sector it can be shown whether the linking occurred during the incremental recording mode, or the restricted overwrite recording mode, and whether the linking occurred immediately after the defective area. In addition, the linking type information can be used for high-speed data processing in a drive since with the linking type information it can be shown at once whether recording data is continuously recorded or divided by the defective area.

The linking scheme which accompanies the defective area according to the present invention can be applied to all the recording modes of the DVD-RW, that is, the write-at-one recording mode, the restricted overwrite recording mode, and the incremental recording mode.

Figure 4:
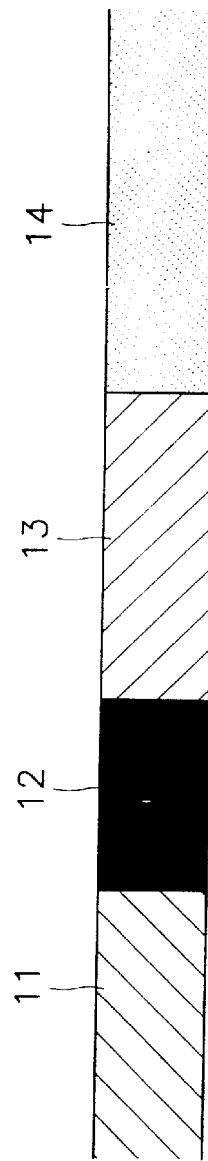
FIG. 4 illustrates another example of a method of processing defective area according to the present invention.

FIG. 4 illustrates another example of a method of processing the defective area according to the present invention. Reference number 11 is a user data area where old data is recorded, reference number 12 is a defective ECC block, reference number 13 is a predetermined number of ECC blocks allocated immediately after the defective ECC block in order to have the same effect as the linking area, and reference number 14 is a user data area where new data is recorded.

According to the present invention, by using an area equal to or larger than 1 ECC block (32 KB) allocated immediately after the defective area detected in certification, the data area from which recording of the new data begins can be detected without using the linking scheme. At this time, the predetermined number of ECC blocks immediately after the defective area can be registered in the RMD area, and it can be defined that the new user data area follows the predetermined number of ECC blocks immediately after the defective area according to a predetermined rule.

In addition, for high speed seek, a reference signal such as a test signal, data or a recording mark which has predetermined patterns, which takes a role of linking data can be recorded in advance in the predetermined number of ECC block area immediately after the defective area.

In recording the actual user data after certification, after a defective area is encountered or met, it is determined whether, for example, a test signal is detected. If the test signal is detected in the ECC blocks, which are allocated immediately after the defective area to have the same effect as the linking area, the new data recording begins in the new user data area immediately after the predetermined number of ECC blocks following the defective area, which is advantageous in real-time recording. Since a groove track can be wobbled, the test signal can also be a wobble signal.

As described above, in addition to the linking which occurs in incremental recording or restricted overwrite recording, the present invention uses linking type information which indicates that linking occurs immediately after the defective area. By doing so, even if a large defect occurs in the recording medium and the reference signals required for recording/reproducing are not generated, the linking scheme can be applied to the area immediately after the defective area, and the new user data recording can begin, which increases reliability of the user data, and performs more reliable reproduction.

Further, according to the present invention, a reference signal such as a test signal, data, a groove wobble pattern, or a recording mark which has a test pattern, which functions as linking data is recorded in advance in a block immediately after the defective area detected during certification. If, for example, the test signal is detected after the defective area, the new user data is recorded immediately after the predetermined number of ECC blocks following the defective area without using linking, reducing the time for recording linking data, which is advantageous to real-time recording.

Further, a playback apparatus reads information recorded according to the present invention.

Figure 5:
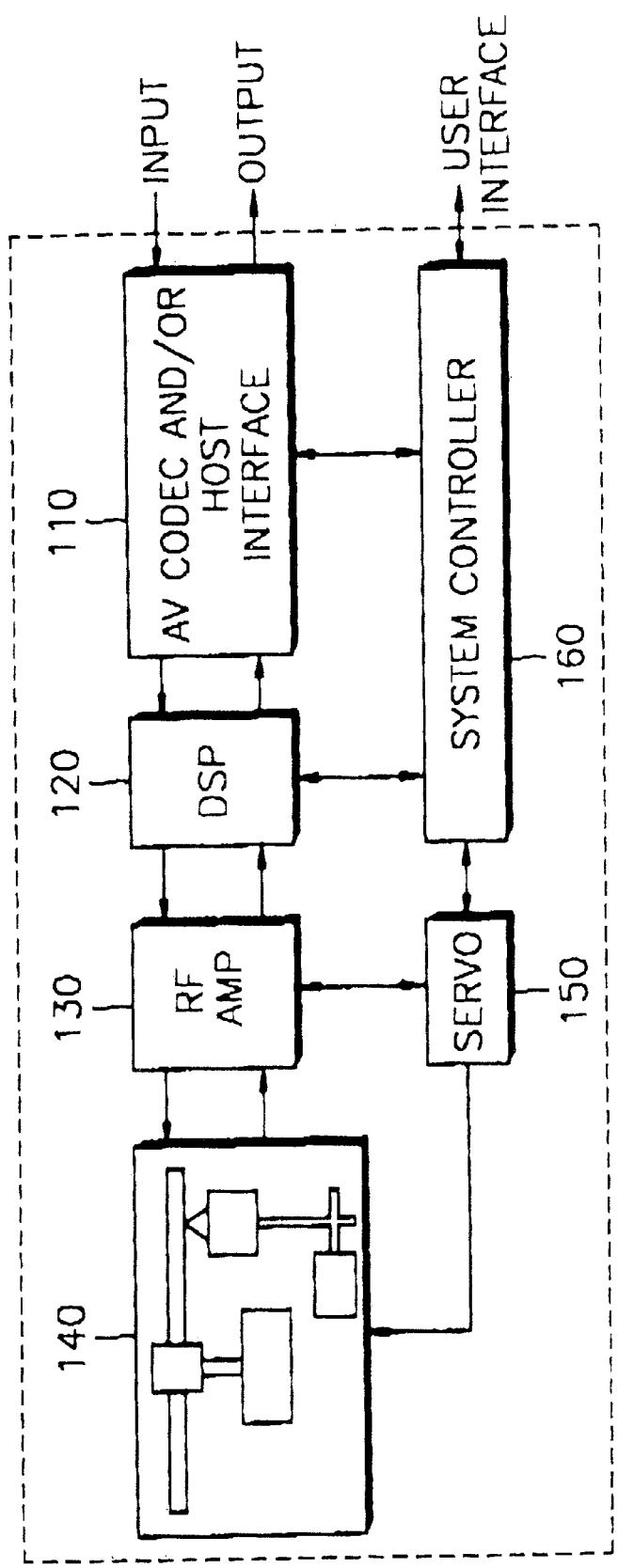
FIG. 5 is a block diagram of a recording/reproducing apparatus for implementing the present invention.

Further, FIG. 5 is a block diagram of a recording/reproducing apparatus for implementing the present invention. The function of the recording/reproducing apparatus for recording/reproducing A/V (audio/video) data using the recordable and rewriteable recording media such as the DVD-RW, DVD-R and DVD-RAM is largely divided into recording and reproduction.

During recording, an AV codec and/or a host interface 110 compression-codes an externally applied AV signal according to a predetermined compression scheme and supplies size information for the compressed data. A digital signal processor (DSP) 120 receives the compressed A/V data supplied from the AV codec and/or the host interface 110, adds additional data for error correction code (ECC) processing thereto, and performs modulation using a predetermined modulation scheme. A radio frequency amplifier (RF AMP) 130 converts the modulated data from the DSP into a radio frequency (RF) signal. Then, a pickup 140 records the RF signal supplied from the RF AMP 130 on a disk mounted on a turn table of the pickup 140. A servo unit 150 receives information necessary for servo control from a system controller 160 and stably performs a servo function for the mounted disk.

During playback of information data stored on the disk, the pickup 140 picks up the optical signal from the disk having the information data stored therein, and the information data is extracted from the optical signal. The RF AMP 130 converts the optical signal into an RF signal, and extracts the servo signal for performing a servo function, and modulated data. The DSP 120 demodulates the modulated data supplied from the RF AMP 130 corresponding to the modulation scheme used during modulation, performs an ECC process to correct errors, and eliminates added data. The servo unit 150 receives information necessary for servo control from the RF AMP 130 and the system controller 160, and stably performs the servo function. The AV codec and/or the host interface 110 decodes the compressed A/V data supplied from the DSP 120 to output an A/V signal. The system controller 160 controls the overall system for reproducing and recording the information data from and on the disk mounted on the turn table of the pickup 140.

The system controller 160 and the DSP 120 handle processing the data during recording and reproduction, including performing linking schemes in connection with recording and reproducing as well as performing linking schemes when processing defective areas on the media during recording and reproducing. In particular, while recording the data after certification, the system controller 160 recognizes one of the defective areas registered in the list of defective areas and controls recording of the data processed by the DSP 120 immediately after the linking area (as specified by the predetermined linking scheme) following the one defective area.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A recording and/or reproducing apparatus recording and reproducing data on a recording medium, comprising:
   a pick-up device which records the data on the recording medium and/or reproduces the data from the recording medium; and
   a processing unit which registers defective areas in a defect management area of the recording medium and allocates a linking area immediately after at least one of the defective areas,
   wherein the linking area comprises a predetermined pattern.

2. The recording and/or reproducing apparatus of claim 1, wherein the processing unit records linking data in advance in the linking area allocated immediately after the one defective area detected during the certification before recording the user data.

3. The recording and/or reproducing apparatus of claim 1, wherein the recordings medium is a digital versatile disc-rewritable (DVD-RW) disk.

4. The recording and/or reproducing apparatus of claim 1, wherein the pick-up device comprises an optical power source which maintains power of a beam emitted from the optical power source at a write power during recording and when the one defective area is found lowers the power to an extent that the lowered power does not affect recording.

5. The recording and/or reproducing apparatus of claim 1, wherein the processing unit allocates 2 kilobytes to the linking area.

6. The recording and/or reproducing apparatus of claim 1, wherein the processing unit allocates 32 kilobytes to the linking area.

7. The recording and/or reproducing apparatus of claim 1, wherein the processing unit applies a linking scheme to the linking area immediately after the one defective area in a restricted overwrite recording mode.

* * * * *

UNITED STATES PATENT AND TRADEMARK OFFICE
CERTIFICATE OF CORRECTION

PATENT NO. : 6,788,630 B1
DATED : September 7, 2004
INVENTOR(S) : Kyung-geun Lee et al.

It is certified that error appears in the above-identified patent and that said Letters Patent is hereby corrected as shown below:

Title page,
Item [56], References Cited, OTHER PUBLICATIONS, change "Standard ECMA-279: 80 mm and 120 mm DVD-Recordable Disk (DVD-R)", December 1998 (1998-12), ECMA; STANDARIZING INFORMATION AND COMMUNICATION SYSTEMS XP002168576, pp. 26-27 and 33-34" to -- "Standard ECMA-279: 80 mm and 120 mm DVD-Recordable Disk (DVD-R)", December 1998 (1998-12), ECMA: STANDARIZING INFORMATION AND COMMUNICATION SYSTEMS XP002168576, pp. 26-27 and 33-34 --.

Column 8,
Line 23, change "and" to -- and/or --.

Signed and Sealed this

Fourth Day of January, 2005

JON W. DUDAS
*Director of the United States Patent and Trademark Office*

UNITED STATES PATENT AND TRADEMARK OFFICE
CERTIFICATE OF CORRECTION

PATENT NO. : 6,788,630 B1
DATED : September 7, 2004
INVENTOR(S) : Kyung-geun Lee et al.

It is certified that error appears in the above-identified patent and that said Letters Patent is hereby corrected as shown below:

Title page,
Insert Item:
-- [30] Foreign Application Priority Data
June 24, 1999 (KR) 1999-23947
May 8, 1999 (KR) 1999-16462
May 12, 1999 (KR) 1999-16973 --.

Signed and Sealed this

Thirty-first Day of January, 2006

JON W. DUDAS
*Director of the United States Patent and Trademark Office*